Figure 1:
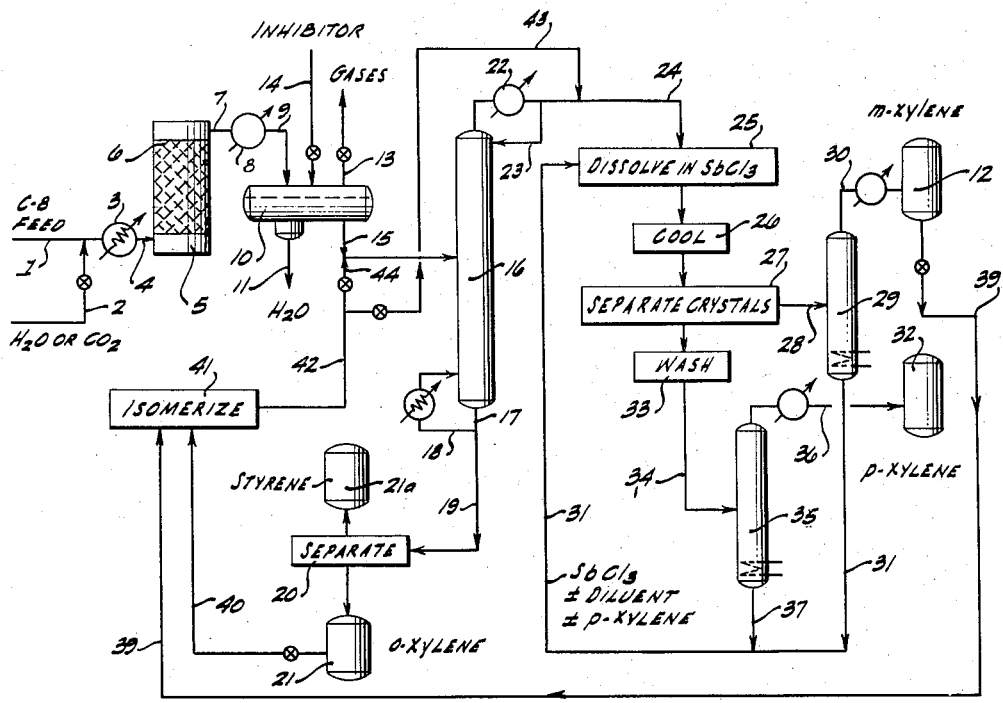

March 24, 1959 C. B. SCOTT ET AL 2,879,313
PROCESS FOR CONVERTING A XYLENE FEED MIXTURE
TO PORA-XYLENE AND STYRENE
Filed Sept. 17, 1953

INVENTORS,
CARLETON B. SCOTT,
WILLIAM D. SCHAEFFER,
BY Launas S. Henderson
AGENT.

2,879,313

PROCESS FOR CONVERTING A XYLENE FEED MIXTURE TO PARA-XYLENE AND STYRENE

Carleton B. Scott, Pomona, and William D. Schaeffer, Ontario, Calif., assignors to Union Oil Company of California, Los Angeles, Calif., a corporation of California Application September 17, 1953, Serial No. 380,762

2 Claims. (Cl. 260—669)

This invention relates to methods for separating mixtures of the C-8 aromatic hydrocarbon isomers, i.e. o-, m- and p-xylenes and ethylbenzene. It relates particularly to the recovery and synthesis of pure p-xylene from mixtures which also contain substantial proportions of ethylbenzene and at least one of the isomers o-xylene or m-xylene. The method comprises essentially a two-stage process wherein ethylbenzene and o-xylene are removed in a first stage, preferably by dehydrogenating the mixture to convert the ethylbenzene to styrene and fractionating the mixture to remove o-xylene and styrene as bottoms, and then treating the m-, p-xylene overhead in a second stage with antimony trichloride to selectively complex the p-xylene. The removal of o-xylene and ethylbenzene from the particular feed mixtures employed herein results in increasing the relative proportion of p-xylene in the remaining mixture, thereby rendering it more amenable to efficient separation with antimony trichloride. The removal of ethylbenzene also permits the utilization of reject m- and o-xylene streams for isomerization, whereby they may be isomerized to extinction to form p-xylene.

A principal object of the invention is to provide methods whereby mixtures of the C-8 aromatic hydrocarbons which contain less than about 30% of p-xylene may be effectively pre-treated to increase the relative proportion of p-xylene therein, whereby the percent recovery and the purity of p-xylene recovered by selective complexing with antimony trichloride is greatly increased. A more specific object is to decrease the required molar ratio of antimony trichloride to p-xylene recovered, thereby effecting economies in materials handling and heat losses, and improving the general efficiency. Another object is to condition the feed stock so that the undesired product streams may be effectively isomerized to form additional p-xylene. Still another object is to provide effective means for separating styrene from xylenes by fractional distillation. Other objects and advantages will be apparent to those skilled in the art from the detailed description which follows:

In the reforming or hydroforming of naphthenic gasoline fractions, an aromatic reformate fraction may be obtained which boils between about 135°–145° C., and consists essentially of the C-8 aromatics in about the following molar proportions:

| | | |
|---|---|---|
| Ethylbenzene | 10–20% | (B.P. 136.1° C.) |
| p-Xylene | 15–25% | (B.P. 138.5° C.) |
| m-Xylene | 40–60% | (B.P. 139.1° C.) |
| o-Xylene | 15–25% | (B.P. 144.4° C.) |

The methods described herein are particularly adapted for the recovery of substantially pure p-xylene in high yields from such mixtures. Previous methods for resolving these fractions are unsatisfactory from several standpoints. Fractional distillation may be feasible for separating o-xylene, or an ethylbenzene concentrate, but is ineffective for obtaining pure p-xylene, due to the proximity of boiling points. Fractional crystallization is complicated by the formation of binary and ternary eutectics, so that even though p-xylene melts at 13.2° C. while m-xylene, o-xylene and ethylbenzene melt at −53.5° C., −29° C., and −94° C. respectively, pure p-xylene may not be obtained from such mixtures except in low yields by repeated fractional crystallizations. Other separation methods have been proposed such as selective sulfonation, but such chemical methods are inherently cumbersome and expensive.

The co-pending application of Carleton B. Scott, filed May 18, 1953, Serial No. 355,532, describes certain methods whereby mixtures such as the above may be treated with antimony trichloride to obtain substantially pure p-xylene. Generally, the method disclosed therein comprises first dissolving an antimony halide such as antimony trichloride or antimony tribromide in the isomeric hydrocarbon mixture to form a single liquid phase. Usually it is necessary to heat the mixture to about 40° to 90° C. to obtain complete solution of the antimony halide. The solution is then cooled, usually to about 10°–40° C., whereupon a crystalline solid precipitates from the solution. The solid is removed, as by filtration, and then distilled to recover overhead a hydrocarbon fraction in which p-xylene predominates. The filtrate is also usually distilled to recover a hydrocarbon fraction relatively lean in p-xylene. The term "extract" is herein employed to refer to the hydrocarbon product recovered from the solid phase, and the term "raffinate" is employed to refer to the hydrocarbon product recovered from the filtrate. The excellent selectivity of this process is indicated by the fact that when it is applied to a feed mixture obtained by extracting a typical petroleum hydrocarbon reformate with a glycol, and comprising about 20% p-xylene, 45% m-xylene, 20% o-xylene and 15% ethylbenzene, the extract recovered contains about 77% of p-xylene, and about 23% of the other components. In other words, the ratio of p-xylene in the extract to the other components is raised from about 0.25/1 to about 2.65/1 in a single operation.

While the selectivity of the foregoing process is excellent, the recovery of p-xylene leaves much to be desired, when the feed mixture contains relatively small amounts of p-xylene i.e. below about 30%. It has therefore been proposed to maintain in the process a relatively large recycle stream of extract p-xylene to the initial complexing step in order to build up the p-xylene content of the feed mixture. This procedure is designed especially for dealing with feed mixtures originally containing less than about 30% by volume of p-xylene. The results thereof may be seen by referring to the attached Figure 2, which is a graph representing the factors, net percent recovery, absolute percent recovery, and purity of the p-xylene extract as functions of the total p-xylene content in the feed mixture. It will be noted that the lower curve A, depicting the net percent recovery from a feed mixture originally containing 20% by volume of p-xylene, reaches a maximum at about 55% net recovery when the xylene content of the feed mixture has been built up to 50%, as by recycling. The net percent recovery refers to the percent of the non-recycle p-xylene in the feed mixture which is recovered in the extract. This curve A demonstrates that for feed mixtures originally low in p-xylene, a substantial increase in efficiency may be obtained by building up the p-xylene content to between about 40% and 60%. It is also clear however that the maximum net recovery possible is about 60% for each separation stage. This efficiency may be considerably improved if a means could be found to increase the proportion of p-xylene in the feed mixture by decreasing the proportion of other isomers therein, thereby elevating the net recovery curve up to or near the absolute recovery curve B.

The absolute recovery is the percent of the p-xylene in the total feed mixture which is recovered in the extract.

Set forth mathematically the absolute recovery and net recovery values may be expressed as follows:

$$\frac{V_1-V_2}{V_1}\times 100 = \text{net percent recovery}$$

$$\frac{V_3}{V_4}\times 100 = \text{absolute percent recovery}$$

Where $V_1$ = volumes of p-xylene in the non-enriched feed mixture,
$V_2$ = volumes of p-xylene in the reject xylene stream,
$V_3$ = volumes of p-xylene in the extract xylenes,
$V_4$ = volumes of p-xylene in the enriched total feed mixture.

Figure 2:
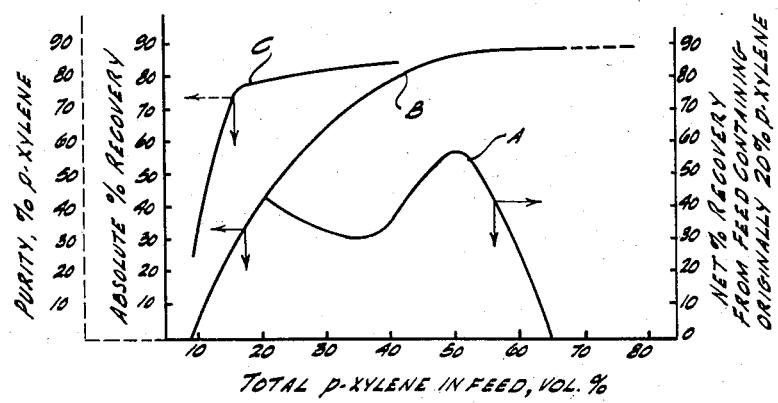

Curve C in Figure 2 represents purity of extract as a function of original concentration of p-xylene in the feed mixture. It will be noted that there is a sharp inflection point in the curve where the p-xylene content of the feed mixture is between 15 and 20%. From this inflection point the purity continues to rise gradually from about 75% up to 93%. The latter value is obtained when the feed mixture contained 75% p-xylene. Insofar as purity is concerned therefore it is practically mandatory to employ feed mixtures containing 20% or more of p-xylene, and preferably more than 40%.

It will be noted that each of the factors purity, absolute recovery and net recovery reach highly desirable levels when the feed mixture contains more than 40% of p-xylene. It will be noted also that, while the recycle procedure for dealing with feed mixtures low in p-xylene is an improvement over not recycling, it would be still more preferable to devise means for elevating the net recovery up to or near the absolute recovery. The present invention is directed toward this latter objective. The particular method employed consists broadly in reducing or eliminating the p-xylene recycle stream by eliminating part of the undesired components in the original feed mixture. It relates particularly to a highly advantageous method whereby the ethylbenzene may be dehydrogenated to styrene without being first separated from the other components, thereby effecting a redistribution of boiling points so that styrene plus o-xylene may be separated from m- and p-xylene by fractionation. This procedure results in decreasing the total volume of feed mixture to thet antimony trichloride stage by about 30–40%, thereby decreasing the initial proportion of antimony trichloride which must be employed. It also increases the relative proportion of p-xylene therein, thus decreasing or eliminating the recycle stream of p-xylene. To totally eliminate the recycle stream by removing ethylbenzene and o-xylene, the raw feed must obviously contain a mole-fraction of p-xylene which is at least two-thirds of the mole fraction of m-xylene contained therein. Whether the recycle stream is partially or totally eliminated, substantial economies in operation brought about by increasing the capacity of the equipment and decreasing handling costs and heat losses.

While any method for removing ethylbenzene, and/or o-xylene, and/or m-xylene prior to the antimony trichloride treatment will enhance the efficiency of the latter, the particular method herein preferred is found to result in still other advantageous features. This particular method consists in catalytically dehydrogenating the feed mixture whereby the ethylbenzene is converted almost quantitatively to styrene, while the xylenes pass through essentially unchanged. The resulting mixture may then be treated, as by solvent extraction or extractive distillation, to separate the styrene from the xylenes. It is preferable however to take advantage of the peculiar redistribution of boiling points brought about by dehydrogenation to remove both o-xylene and styrene from the product, leaving essentially only m- and p-xylene to be treated by complexing with antimony halide. The feasibility of this operation may be appreciated from a consideration of the boiling points:

| | °C. |
|---|---|
| p-Xylene | 138.35 |
| m-Xylene | 139.1 |
| o-Xylene | 144.4 |
| Styrene | 146 |

It will be seen that ethylbenzene, originally the lowest boiling component, is transformed to styrene, the highest boiling component. By fractionating the mixture in an efficient column, it is possible to separate styrene plus o-xylene as bottoms, while taking m- and p-xylene overhead. The latter two materials may be effectively separated by selective complexing with antimony trichloride, and are least effectively separated by distillation. The styrene-o-xylene fraction may be resolved into its components by any suitable method such as extractive distillation or solvent extraction, etc.

When ethylbenzene-containing feed stocks are directly treated with antimony trichloride, the raffinate from that step will contain substantially all of the ethylbenzene, and most of the m- and o-xylenes. The economical utilization of this raffinate stream is difficult. Ordinarily there is not sufficient p-xylene therein to warrant its recovery by further treatment with antimony trichloride. The mixture is not well suited for conversion to p-xylene by isomerization because the ethylbenzene causes extensive disproportionation to occur as exemplified by the equations:

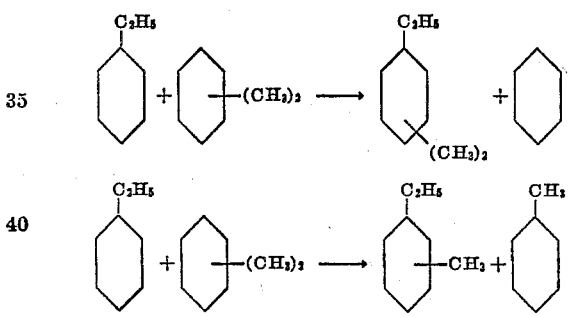

By removing ethylbenzene, the raffinate from the antimony trichloride separation may be effectively isomerized to form the equilibrium proportion of p-xylene with little or no formation of ethylbenzene, and without causing disproportionation.

While as indicated above, any method for removing ethylbenzene, o-xylene or m-xylene would be highly beneficial, the specific dehydrogenation process contemplated herein is especially advantageous in that, with feed mixtures which contain not more than about 20% ethylbenzene, substantially 100% conversion thereof to styrene may be obtained employing dehydrogenation conditions which are known in the art i.e. temperatures from about 575° to 700° C., and preferably between 600° and 650° C., and pressures between about 0 and 500 p.s.i.g. A variety of catalysts may be employed such for example as zinc oxide, chromium oxide, tungsten oxide, iron oxide, magnesium oxide, activated charcoal, activated aluminas, bauxites, etc. Combinations of these materials with other components may also be employed such for example as copper-chromia, cobalt-molybdena, chromia-molybdena, etc. These materials may be employed in substantially pure powdered form, or pelleted in tablet form, or they may be impregnated on carrier materials such as alumina, bauxite, clays, etc. In general any of the well known hydrogenation-dehydrogenation catalysts may be employed, which are generally oxides, sulfides or finely divided metallic forms of the metals from groups VIB and VIII of the periodic table.

Although, in the dehydrogenation step, the xylenes function as an inert diluent, lowering the partial pressure of styrene and thereby increasing the yield, it may be desirable to add further quantities of inert gases such as $H_2O$, $CO_2$, $N_2$, etc. Generally between about 1 and 4 moles of such gases per mole of feed mixture may be employed. The feed rate of hydrocarbons may vary considerably but good results are obtained at space velocities of between about 0.1 and 5.0 volumes, and preferably between 0.3 and 0.8 volume of liquid feed per volume of catalyst per hour. Under the conditions herein described the catalyst retains its activity for long periods of time, up to a year or more. However in case it should become contaminated it may be periodically regenerated in a stream of air at for example 500° to 600° C.

The details of the process may perhaps be better understood by referring to the accompanying Figure 1 which is a schematic flowsheet illustrating some of the specific modifications which may be employed.

The vaporized feed mixture of C–8 aromatic hydrocarbons is brought in through line 1 and admixed with a suitable proportion of diluent gas such as steam or carbon dioxide admitted through line 2. The mixed gases are then heated to the reaction temperature in heater 3 and passed through line 4 into dehydrogenation reactor 5 which is packed with a catalyst 6. The hot gases pass upwardly under the conditions described above, the latent heat of the inert gases and non-reactive hydrocarbons supplying the endothermic heat requirements. After a suitable contact time as indicated above, the reaction gases are removed through line 7, condensed in heat exchanger 8, and passed through line 9 into a surge tank 10. Any condensed water is removed through line 11, and the fixed gases such as $H_2$, $CO_2$, $N_2$, etc. are released through line 13. The hydrocarbons accumulating in vessel 10 will contain about 10–20 volume percent of styrene. To condition the mixture for subsequent distillation a suitable quantity of polymerization inhibitor such as elemental sulfur or p-tert-butyl catechol may be admitted through line 14.

The inhibited hydrocarbon mixture is then drawn off through line 15 and transferred to distillation column 16. To effect the desired separation of styrene plus o-xylene as bottoms from m- and p-xylene as overhead, column 16 should contain at least about 70–80 actual plates, and it should be operated at low temperatures and pressures to avoid polymerization. The bottoms temperature in column 16 should not be allowed to exceed about 120° C., and should preferably range between about 90° and 110° C. Vacuum jets and cooling water may be employed to keep the top of the column at the desired pressure, e.g. between about 30 and 75 mm. Hg. It should be noted that the presence of o-xylene in the bottom of the column permits a higher bottoms temperature than can be safely employed when pure styrene is present, even though inhibitors are present. With pure styrene as bottoms, such a column would need to be maintained at not more than about 90° C. in order to prevent polymerization.

The bottoms from column 16 is drawn off through line 17 and a portion thereof may be recycled through line 18 as bottoms reflux. The net bottoms is transferred through line 19 to a separation step indicated generally at 20, wherein o-xylene is recovered and sent to storage tank 21, while styrene is taken off and transferred to storage tank 21a. The separation of styrene and o-xylene is not feasible by distillation. However many other suitable methods may be employed which form no essential part of the present invention. For example they may be separated by solvent extraction with various solvents such as ethylene glycol, water-ethanol, or they may be separated by extractive distillation.

The overhead from column 16 is condensed in heat exchanger 22, and a part thereof is returned through line 23 as reflux. The net overhead, now consisting essentially of m- and p-xylene, with traces only of o-xylene and ethylbenzene, is transferred via line 24 to the antimony trichloride separation step indicated generally at 25. In this step the xylene mixture is admixed with preferably between about 0.5 and 5.0 moles of antimony trichloride or antimony tribromide per mole of mixed xylenes, and the mixture is heated and agitated until solution is complete. Preferably an inert diluent is employed in this step such as a liquid aliphatic hydrocarbon such as hexane, heptane, octane, iso-octane, decane, dodecane, etc., whose boiling point is substantially different from that of the aromatic components of the feed mixture. Such diluents are employed in amounts representing about 0.1 to about 5 times the volume of the hydrocarbon feed mixture being treated, and may be admixed with the feed mixture and antimony halide at any time prior to the crystallization of the solid phase. The presence of such a diluent during the crystallization facilitates separation of the solid and liquid phases, and effects a substantial increase in the concentration of p-xylene which is ultimately obtained. To obtain complete solution of the components it may be necessary to heat the mixture to about 40° to 90° C.

After complete solution is obtained the mixture is then fractionally crystallized in step 26, preferably by cooling the mixture to between about 10° and 40° C. In some cases it may be desirable to seed the cooled mixture with crystals obtained from a previous separation. After crystallization is complete the slurry is then transferred to separation step 27 wherein the crystalline material is separated from the mother liquor by decantation, filtration, centrifuging, etc. The filtrate is taken off through line 28 and transferred to distillation column 29 wherein an overhead consisting predominantly of m-xylene is removed through line 30, and sent to storage tank 12. The bottoms from column 29 consist mainly of antimony trichloride and the inert thinner, if a thinner was employed. This mixture need not be separated inasmuch as it is recycled through line 31 to the initial complexing step 25.

The solid phase from separation step 27 is then preferably washed with further quantities of the inert thinner in step 33 to remove the interstitial phase consisting mainly of m-xylene. After washing, the solid phase is then transferred through line 34 to distillation column 35. In column 35 the solid crystals are melted and distilled to obtain an overhead in line 36 consisting essentially of p-xylene, which is sent to storage tank 32. The bottoms product is composed mainly of antimony trichloride, which is removed through line 37, and recycled to step 25 via line 31. If it is desired to recycle some p-xylene to step 25 the distillation in column 35 may be carried out in such manner as to strip out only part of the p-xylene, while leaving a portion thereof in the bottoms product for recycle to step 25. It will be understood of course that the objective is to maintain at least about 40% of p-xylene in the total aromatic feed to step 25. In some cases the feed mixture in line 24 may contain this amount of p-xylene, in which case no p-xylene need be recycled.

The relatively pure m-xylene in storage tank 12 and the o-xylene in storage tank 21 may be utilized per se if there is sufficient demand for those materials. However, there is at present little commercial use for m-xylene and it is hence preferable to convert that material to p-xylene for which there is a considerably greater demand. The same is true to a lesser extent of o-xylene. For these reasons part or all of the m-xylene and o-xylene may be transferred via lines 39 and 40 to an isomerization step 41 wherein these materials are subjected to known isomerization conditions, and thereby converted in part to p-xylene.

It has been found that in the isomerization of xylenes, there is a distinct advantage in utilizing feed mixtures which are substantially free from ethylbenzene. It is well known that the ethyl group on the benzene nucleus is considerably more labile than the methyl groups. If ethylbenzene is present it is virtually impossible to selectively isomerize the xylenes intramolecularly without causing considerable disproportionation, resulting in the production of benzene, toluene and C-9 hydrocarbons. However, utilizing an ethylbenzene-free feed, it has been found possible to form an equilibrium isomerizate without effecting any appreciable disproportionation. The conditions employed for obtaining such isomerization may be divided into two general categories. In the first category, the feed mixture is contacted with a Friedel-Crafts type catalyst such as aluminum chloride or hydrogen fluoride. If aluminum chloride is employed a promoter is necessary such as water, hydrochloric acid, sodium chloride or hydrogen fluoride. The temperature for this reaction may range between about 75° and 200° C., and preferably between 100° and 150° C. The contact time may vary between about 10 minutes and 2 hours and preferably about 20 to 40 minutes. Alternatively, the isomerization may be carried out in vapor phase over solid contact catalysts such as silica, silica-alumina, acid treated clays, silica-zirconia, magnesia, thoria, boron oxide, etc. at temperatures between about 250° and 650° C. and preferably about 500° to 600° C. The space velocity may range between about 0.2 and 20 volumes of liquid feed per volume of catalyst per hour.

The isomerizate recovered from any of the above procedures may have approximately the following composition:

| | Percent |
|---|---|
| o-Xylene | 15–30 |
| m-Xylene | 35–65 |
| p-Xylene | 10–25 |

This isomerizate may be utilized according to either of two principal modifications. If there is no reason for excluding o-xylene from the antimony trichloride separation system, the whole mixture may be recycled through lines 42 and 43 to the initial antimony trichloride step 25. In this case the raffinate which is collected in tank 12 will contain both m- and o-xylenes. This procedure slightly decreases the efficiency of the antimony trichloride process and hence may not be preferred, especially if a pure m-xylene stream is desired for other purposes. According to the preferred method for utilizing the isomerizate, it is cycled at least in part through lines 42, 44 and 15 to the primary fractionation column 16 wherein the o-xylene is separated along with styrene as previously described. This mode of operation is highly advantageous in that it results in diluting the bottoms fraction in column 16 with additional o-xylene, thereby decreasing the tendency of the styrene to polymerize during distillation. Preferably the o-xylene concentration in the lower part of the column should be at least about twice that of styrene. This permits column 16 to be operated at considerably higher temperatures than are permissible when the bottoms product is substantially pure styrene, thereby increasing the capacity of the column. It will be seen therefore that the difficult fractionation of styrene from xylenes is facilitated at the same time that the undesired o- and m-xylene streams are being continuously converted to p-xylene. It will be seen also that the fractionation column 16 is well adapted for the simultaneous fractionation of the xylene isomerizate and the dehydrogenation effluent in a manner which greatly improves the efficiency of the antimony trichloride separation.

The following examples serve to illustrate specific conditions and results which may be obtained in the practice of this invention, but they should not be interpreted as limiting the scope thereof.

EXAMPLE I

This example illustrates the manner in which the recovery and purity of the p-xylene varies with the concentration of that compound in the feed mixture. The following data, set forth in Table 1, was obtained by dissolving antimony trichloride in a number of mixtures comprising p-xylene in varying proportions. In all cases the molar ratio of antimony trichloride to total xylenes was 2.0, and the mixtures were warmed to about 60°–70° C. to obtain complete solution of the antimony trichloride. Each solution was then cooled to about 20°–25° C., and the solid which was thereby precipitated was filtered off and steam distilled. The distillates were analyzed for p-xylene (ultraviolet absorption), and the recovery factor and percent purity of the p-xylene was determined in each case. The results are as follows:

Table 1

| Run No. | Composition of Feed Mixt., Vol. Percent | | | | Recovery, percent para | Purity, Vol. percent para |
|---|---|---|---|---|---|---|
| | p-xylene | m-xylene | o-xylene | Et. Bz. | | |
| 1 | 9.0 | 54.6 | 18.2 | 18.2 | 1.1 | 25.4 |
| 2 | 20.0 | 45.0 | 20.0 | 15.0 | 36.5 | 77.3 |
| 3 | 24.5 | 45.4 | 15.1 | 15.1 | 49.0 | 80 |
| 4 | 32.7 | 40.3 | 13.5 | 13.5 | 68.6 | 81.8 |
| 5 | 37.5 | 37.5 | 12.5 | 12.5 | 75 | 84.9 |
| 6 | 44.4 | 33.3 | 11.1 | 11.1 | 86.1 | 83 |
| 7 | 61.0 | 16.0 | 8.0 | 15.0 | 85.8 | 89 |
| 8 | 75.0 | 7.0 | 3.0 | 15.0 | 88.6 | 93.2 |

This data is presented graphically in Figure 2, which has been heretofore explained. It will be readily apparent that the optimum recovery and purity of p-xylene from such mixtures is attained only when the concentration thereof in the feed mixture is above about 40%, preferably above about 50%.

EXAMPLE II

A feed mixture having the composition shown in Table 2 is vaporized, admixed with 1 mole proportion of water vapor, and heated to about 650° C. The hot mixture is then passed continuously at the rate of 0.6 volume of liquid hydrocarbons per volume of catalyst per hour through a bed of copper-chromia catalyst contained in an insulated reactor. The effluent is then condensed to separate water and fixed gases. The hydrocarbon phase is saturated with elemental sulfur and passed continuously, in admixture with a xylene isomerizate obtained as hereinafter set forth, to a 90 plate fractionating column operated under reduced pressure at a bottoms temperature of about 110° C., and an overhead reflux ratio of 10/1. The bottoms product is treated by glycol extraction to separate o-xylene and styrene. The condensed overhead, in admixture with the stated proportion of recycle p-xylene, is then admixed with about 2 mole proportions of antimony trichloride, and the mixture is heated to 68° C. to obtain complete solution. The resulting solution is then cooled to about 25° C. and the resulting solid complex is separated from the raffinate by filtration. The crystalline extract is washed with a small quantity of n-dodecane. The raffinate is subjected to distillation to recover an overhead consisting predominantly of m-xylene. The washed, solid extract is then melted and subjected to distillation to recover the extract p-xylene overhead. About 36.8% of this overhead p-xylene stream is recycled to the feed mixture going to the antimony trichloride complexing step, and the remaining 63.2% of overhead constitutes the net xylene production.

The m-xylene overhead obtained from distillation of the raffinate is mixed with the above o-xylene fraction, and the mixture is isomerized by contacting for about 30 minutes with aluminum chloride containing about 2% HCl at about 120° C. The isomerizate is separated from the catalyst and distilled in the same column along with the dehydrogenation effluent as described above. In a continuous process under these conditions, the following approximate materials balance prevails at equilibrium:

Table 2

| | Pounds per hour of— | | | | | Total |
|---|---|---|---|---|---|---|
| | p-xylene | m-xylene | o-xylene | Et. Bz. | Styrene | |
| 1. Fresh feed | 210 | 410 | 200 | 180 | | 1,000 |
| 2. Dehydrogenation effluent | 208 | 402 | 198 | 6 | 168 | 982 |
| 3. Total feed to fract. column | 960 | 1,755 | 938 | 6 | 168 | 3,827 |
| 4. Overhead from fract. column | 950 | 1,745 | 8 | 4 | | 2,707 |
| 5. Bottoms from fract. col | 10 | 10 | 930 | | 168 | 1,118 |
| 6. SbCl₃ extract (net) | 680 | 110 | 2 | | | 792 |
| 7. SbCl₃ extract (recycle) | 400 | 64 | 1 | | | 465 |
| 8. SbCl₃ raffinate | 270 | 1,709 | 5 | | | 1,988 |
| 9. Isomerization effluent | 752 | 1,355 | 740 | 4 | | 2,847 |

This example shows the production of 86% pure p-xylene, at a recovery per complexing stage of 80%, and an ultimate p-xylene yield of 83%, based on the total non-ethylbenzene components of the feed mixture. By adding another complexing stage with antimony trichloride, the extract may be further purified to obtain 97+% pure p-xylene. In this example sufficient recycle p-xylene is employed to maintain about 43% thereof in the feed mixture which goes to the antimony trichloride treatment. To obtain this proportion it is necessary to recycle only 36.8% of the p-xylene extract. If the o-xylene and ethylbenzene were not previously removed from the feed mixture, it would be necessary to recycle about 68% of the product p-xylene in order to obtain a 43% concentration of p-xylene in the feed mixture to be treated with antimony trichloride. It is clear therefore that removing the ethylbenzene and o-xylene results in almost a 100% improvement in over-all efficiency.

While the above examples are limited to specific conditions and proportions, it is contemplated that these factors may be varied considerably to obtain substantially the same results as set forth herein. The foregoing disclosure is therefore not to be considered as limiting, since many variations may be made by those skilled in the art without departing from the scope or spirit of the following claims.

We claim:

1. A process for converting a feed xylene mixture substantially entirely to p-xylene and styrene, said feed mixture comprising between about 15–30% p-xylene and between about 5–30% of ethylbenzene, the remainder thereof consisting essentially of m-xylene and o-xylene in substantial proportions, which comprises first subjecting said feed mixture to selective dehydrogenation at a temperature between about 575° and 700° C. in the presence of an active dehydrogenation catalyst to thereby convert substantially all of said ethylbenzene to styrene, subjecting the dehydrogenation effluent to fractional distillation to obtain a bottoms fraction consisting essentially of o-xylene and styrene and an overhead fraction consisting essentially of m- and p-xylene, separating styrene from o-xylene in said bottoms fraction, contacting said overhead fraction with between about 0.5 and 5.0 mole-proportions of a complexing agent selected from the class consisting of antimony trichloride and antimony tribromide at an elevated temperature to obtain a homogeneous solution, cooling the resulting solution to precipitate a solid complex of p-xylene, separating said complex from its m-xylene-rich raffinate, recovering p-xylene from said complex, subjecting said m-xylene-rich raffinate in admixture with said o-xylene recovered from said bottoms fraction to isomerization in the presence of an isomerization catalyst to thereby convert a substantial proportion of said o-xylene and m-xylene to p-xylene, recycling the resulting isomerizate to said fractional distillation step, thereby (1) increasing the concentration of o-xylene in said bottoms fraction and retarding the polymerization of styrene, and (2) volatilizing additional p-xylene into said overhead fraction for recovery with said complexing agent.

2. A process as defined in claim 1 wherein sufficient of the p-xylene in said recovered complex is recycled to the overhead fraction from said fractional distillation to maintain at least about 40% of p-xylene therein.

References Cited in the file of this patent
UNITED STATES PATENTS

| 2,656,397 | Holzman et al. | Oct. 20, 1953 |
| 2,768,222 | Nixon et al. | Oct. 23, 1956 |

FOREIGN PATENTS

| 541,797 | Great Britain | Dec. 11, 1941 |
| 625,570 | Great Britain | June 30, 1949 |

OTHER REFERENCES

International Critical Tables, vol. IV, first ed. (1928), pages 192–193. Published by McGraw-Hill Book Company, New York, N.Y.